UNITED STATES PATENT OFFICE.

ROBERT SCHERER, OF VIENNA, AUSTRIA, ASSIGNOR TO HERMAN BARNA, OF ST. PAUL, MINNESOTA.

ADHESIVE AND COATING COMPOSITION.

1,409,472.      Specification of Letters Patent.      Patented Mar. 14, 1922.

No Drawing.      Application filed August 19, 1921. Serial No. 493,656.

*To all whom it may concern:*

Be it known that I, ROBERT SCHERER, manufacturer, a citizen of the Republic of Austria, residing at XIX Hohenauergasse 16, Vienna, Austria, have invented Adhesive and Coating Compositions, (for which I have made application in Austria June 26, 1917,) of which the following is a specification.

This invention relates to a composition suitable for use as an adhesive, or for coating and painting purposes. According to the present invention the composition consists of a mixture of casein, sulphite, a fluorine salt and alkaline earth in suitable proportions. A preferred mixture consists of casein, sodium sulphite free from water, sodium fluoride and calcium oxide or calcium hydroxide. By wetting or mixing (dissolving or suspending) the mixture, which is obtained as a powder with water a composition is obtained which forms a very efficient binding agent.

For painting and coating purposes a colouring or a fire proofing agent is added to the mixture of casein, sulphite, a fluorine salt and alkaline earth.

As colouring and fire proofing agents, metallic oxides may be used alone or in conjunction with fire proofing means. For instance suitable additions are zinc-white, molybdate of sodium, kaolin or porcelain-clay, chalk, glass-powder asbestos, talcum, sodium silicate in powdered form and the like.

The additions may be dispensed with, if the composition is employed as an adhesive order to glue paper, wood and the like. Before using the mixture it is dissolved or suspended in water.

A suitable mixture is composed of—

100 parts of weight of casein,
2-8 " " " of sodium fluoride,
5-8 " " " of sodium sulphite,
10-20 " " " of powdered calcium oxide or hydroxide.

The composition of the mixture may be varied according to the purpose, for which the composition or coating is intended.

Molybdate of sodium may preferably be used as addition agent say 0, 5-3 parts of weight.

By carrying out the process of producing the composition the casein precipitated may be mixed with a fluorine salt such as sodium fluoride. After drying and pulverizing the mixture the other components are added as a powder.

What I claim is:

1. A composition adapted for coating and painting purposes, comprising a mixture of casein, a sulphite, a fluorine salt, and alkaline earth.

2. A composition adapted for coating and painting purposes, comprising a mixture of casein, a sulphite, a fluorine salt, and alkaline earth, with the addition of a colouring agent.

3. A composition adapted for coating and painting purposes, comprising a mixture of casein, a sulphite, a fluorine salt, and alkaline earth, with the addition of a firepoofing agent.

4. A composition adapted for coating and painting purposes, comprising a mixture of casein, a sulphite, a fluorine salt, and alkaline earth, with the addition of a colouring agent and a fireproofing agent.

5. A composition comprising a mixture of casein, sodium-sulphite, sodium fluoride, and calcium-oxide or hydroxide.

6. A composition comprising a mixture of casein, sodium-sulphite, sodium fluoride, and calcium-oxide or hydroxide, with the addition of a colouring agent.

7. A composition comprising a mixture of casein, sodium-sulphite, sodium fluoride, and calcium-oxide or hydroxide, with the addition of a colouring agent and a fireproofing agent.

ROBERT SCHERER.